United States Patent
Yoshitake

(10) Patent No.: US 12,326,730 B2
(45) Date of Patent: Jun. 10, 2025

(54) AUTONOMOUS SYSTEM AND ITS CONTROL METHOD

(71) Applicant: Hitachi, Ltd., Tokyo (JP)

(72) Inventor: Hiroshi Yoshitake, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 728 days.

(21) Appl. No.: 17/584,247

(22) Filed: Jan. 25, 2022

(65) Prior Publication Data

US 2023/0236597 A1 Jul. 27, 2023

(51) Int. Cl.
| | |
|---|---|
| *B65G 1/137* | (2006.01) |
| *B65G 1/10* | (2006.01) |
| *G05D 1/00* | (2006.01) |
| *G06Q 10/08* | (2024.01) |
| *G06Q 10/087* | (2023.01) |

(52) U.S. Cl.
CPC ......... *G05D 1/0088* (2013.01); *B65G 1/1375* (2013.01); *G05D 1/0297* (2013.01); *G06Q 10/08* (2013.01); *G06Q 10/087* (2013.01); *G05B 2219/39001* (2013.01); *G05B 2219/50393* (2013.01)

(58) Field of Classification Search
CPC .. G05D 1/0088; G05D 1/0297; B65G 1/1375; B65G 1/10; G05B 2219/39001; G05B 2219/50393; G06Q 10/08; G06Q 10/087
See application file for complete search history.

(56) References Cited

U.S. PATENT DOCUMENTS

| | | | |
|---|---|---|---|
| 2016/0129592 A1* | 5/2016 | Saboo | B25J 5/007 |
| | | | 700/248 |
| 2020/0244707 A1* | 7/2020 | Silver | G06F 18/214 |

FOREIGN PATENT DOCUMENTS

| | | | | |
|---|---|---|---|---|
| JP | 2020505293 A | 2/2020 | | |
| JP | 2020040159 A | 3/2020 | | |
| WO | WO-2005039837 A1 * | 5/2005 | ............ | B25J 9/1694 |
| WO | WO-2020153297 A1 * | 7/2020 | ............. | B25J 13/08 |

OTHER PUBLICATIONS

Kurosaki, et al., WO-2020153297-A1 (Year: 2020).*
Office Action dated Nov. 13, 2023, in counterpart Japanese Patent Application No. 2023-006666.
(Continued)

*Primary Examiner* — Ernesto A Suarez
*Assistant Examiner* — Laurence R Brothers
(74) *Attorney, Agent, or Firm* — PROCOPIO, CORY, HARGREAVES & SAVITCH LLP

(57) ABSTRACT

Systems and methods described herein are directed to an environment involving a plurality of robots, wherein for receipt of a plurality of orders, the systems and methods generate a plurality of task batches to fulfill the plurality of orders; generate a parameter set for execution by the plurality of robots to execute the plurality of task batches. For a determination by a controller that one or more of the plurality of robots is to execute the plurality of task batches, the systems and methods load the parameter set; and control the one or more of the plurality of robots based on the loaded parameter set to execute the task batch.

13 Claims, 7 Drawing Sheets

(56) References Cited

OTHER PUBLICATIONS

Finn, Chelsea. et al. "Model-Agnostic Meta-Learning for Fast Adaptation of Deep Networks" Proceedings of the 34th International Conference on Machine Learning, Jul. 18, 2017. (13 Pages).
Koster, Rene de. et al, "Design and Control of Warehouse Order Picking; a literature review" ERIM Report Series Research in Management,ERS-2006-005-LIS. Jan. 2006. (30 pages).

* cited by examiner

| Task batch ID | Parameter set ID | Parameter 1 | Parameter 2 | ... | Parameter N |
|---|---|---|---|---|---|
| 1 | A | 1.017 | -0.433 | ... | 0.004 |
| 2 | B | 5.142 | 2.386 | ... | -10.002 |
| 3 | C | ... | ... | ... | ... |
| 4 | D | ... | ... | ... | ... |
| ... | ... | ... | ... | ... | ... |

FIG. 6

AUTONOMOUS SYSTEM AND ITS CONTROL METHOD

BACKGROUND

Field

The present disclosure is generally related to robotic systems, and more specifically, to facilitating autonomous systems along with their control methods.

Related Art

Various operations in industrial sites such as logistics warehouses and production lines have become automated due to the need to overcome the labor shortage and to achieve highly efficient and long-hour operations. These automated operations can be realized by replacing human workers with intelligent robots. Most of these robots in the related art are controlled with a rule-based logic when tasks are aggregated into a batch and fed into the automated system. However, the robotic automated system tends to handle higher-mixed and lower-volume shipping orders due to the shortening of product life cycles and the expansion of markets. Processing a variety of orders leads to the increase in complications for the tasks, and causes the operation environments to become more dynamic.

Recent studies address to apply Artificial Intelligence (AI) such as reinforcement learning to the robot control that can be adapted flexibly to various situations through the training period. Unlike the rule-based control, the AI-based one does not require the installation of predefined if-then rules for each operation so that it can be easily installed to unknown situations. However, the training period takes time to acquire its optimal control strategy, so it is hard to quickly establish the optimal strategies for the tasks allocated to the system at the last minute. As a solution to overcome such the long-training issue, an initialization method of the control strategy has been proposed in the related art for the fast training in various situations by using the meta-learning approach.

SUMMARY

Even if the optimal AI-based strategy can be obtained in a short time, it is hard to maintain the optimal control when a plurality of task sets having different policy optimal strategies are operated in parallel. Therefore, a flexible robot control method, that can quickly adapt its optimal control strategy to the unknown tasks and different layouts, is needed to achieve the efficient operations in industrial sites. In example implementations described herein, the controller stores multiple parameters sets of control strategy and switches among them based on the classification and priority of the task sets.

Aspects of the present disclosure can involve a method for a system involving a plurality of robots, the method involving for receipt of a plurality of orders, generating a plurality of task batches to fulfill the plurality of orders; generating a parameter set for execution by the plurality of robots to execute the plurality of task batches; and for a determination by a controller that one or more of the plurality of robots is to execute the plurality of task batches, loading the parameter set; and controlling the one or more of the plurality of robots based on the loaded parameter set to execute the plurality of task batches.

Aspects of the present disclosure can involve a computer program storing instructions for a system involving a plurality of robots, the instructions involving for receipt of a plurality of orders, generating a plurality of task batches to fulfill the real time order; generating a parameter set for execution by the plurality of robots to execute the plurality of task batches; and for a determination by a controller that one or more of the plurality of robots is to execute the plurality of task batches, loading the parameter set; and controlling the one or more of the plurality of robots based on the loaded parameter set to execute the plurality of task batches. The computer program and instructions can be stored on a non-transitory computer readable medium and executed by one or more processors.

Aspects of the present disclosure can involve a system involving a plurality of robots, the system involving for receipt of a plurality of orders, means for generating a plurality of task batches to fulfill the real time order; means for generating a parameter set for execution by the plurality of robots to execute the plurality of task batches; and for a determination by a controller that one or more of the plurality of robots is to execute the plurality of task batches, means for loading the parameter set; and means for controlling the one or more of the plurality of robots based on the loaded parameter set to execute the plurality of task batches.

Aspects of the present disclosure can involve an apparatus managing a system involving a plurality of robots, the apparatus involving a memory configured to store instructions, and a processor configured to execute the instructions in the memory to execute a process involving for receipt of a plurality of orders, generating a plurality of task batches to fulfill the real time order; generating a parameter set for execution by the plurality of robots to execute the plurality of task batches; and for a determination by a controller that one or more of the plurality of robots is to execute the plurality of task batches, loading the parameter set; and controlling the one or more of the plurality of robots based on the loaded parameter set to execute the plurality of task batches.

BRIEF DESCRIPTION OF DRAWINGS

FIG. 6 illustrates an example of a data table of parameter sets used for the control strategy of RC in accordance with an example implementation.

DETAILED DESCRIPTION

Figure 1:
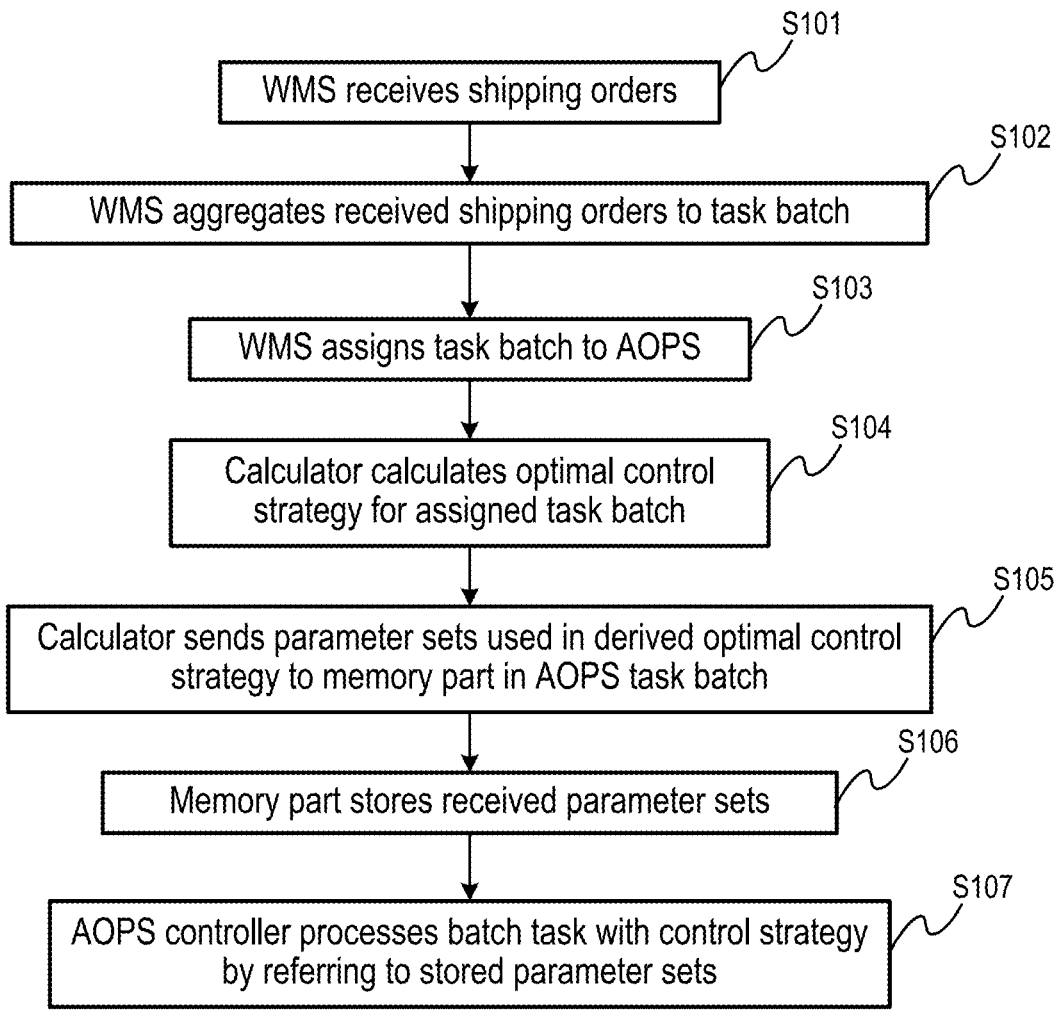
FIG. 1 illustrates the process flow of the Automated Order Picking System (AOPS), in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The present embodiment represents an application example of the invention to the automated order picking operation in logistics warehouse.

Figure 2:
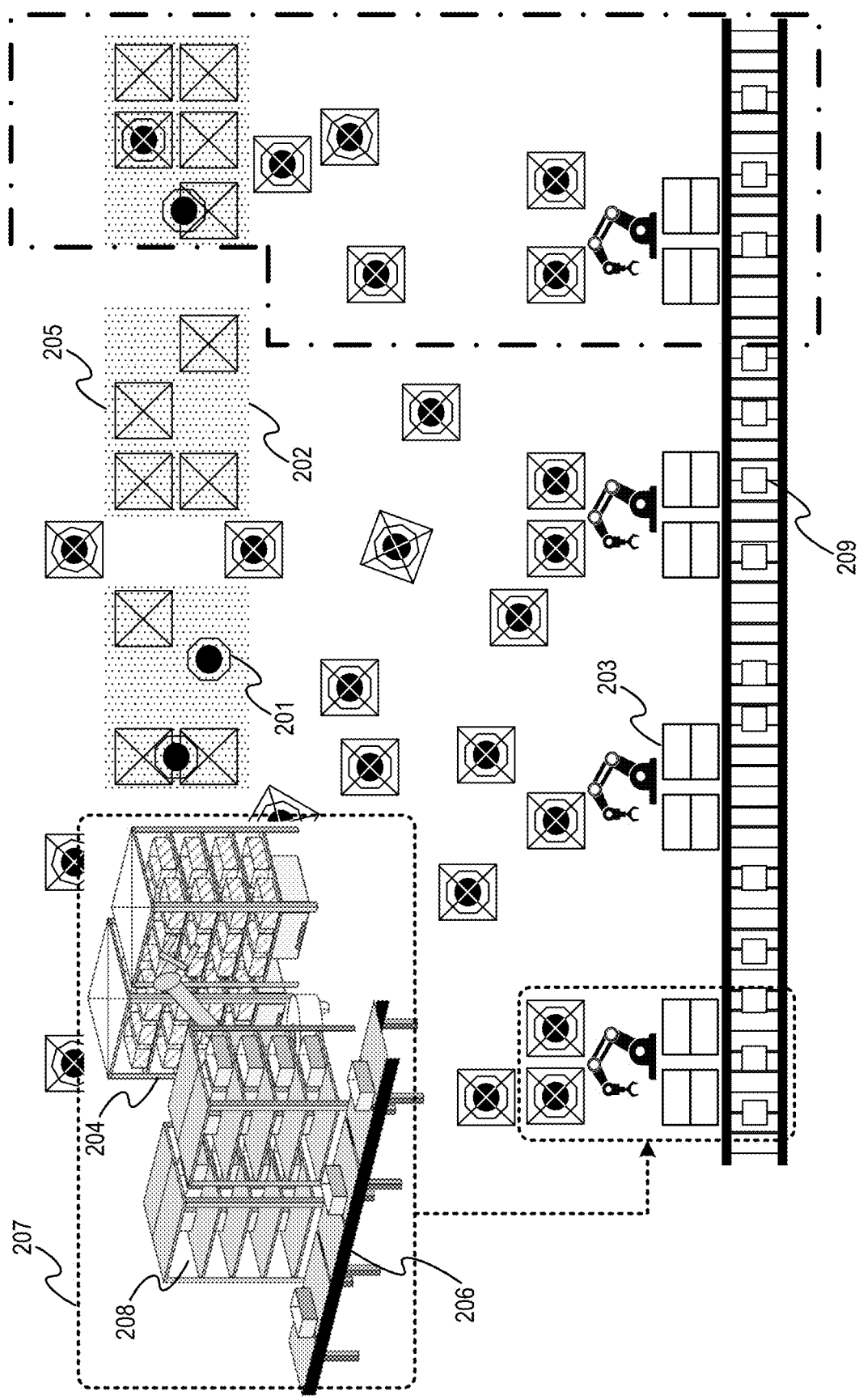
FIG. 2 shows an example of AOPS on which the example implementations may be applied.

FIG. 1 illustrates the process flow of the Automated Order Picking System (AOPS), in accordance with an example implementation. FIG. 2 shows an example of AOPS (200) on which the example implementations may be applied. The process flow of the AOPS of FIG. 1 will be described with respect to FIG. 2. The order picking operations are fully automated by fleets of Automated Guided Vehicles (AGVs, 201) and picking robots (PRs). There are two types of shelves used in the system. The first one is an inventory shelf (202) for storing items. The second is a sorting shelf (203) that includes shipping boxes (208) to sort the ordered items. The inventory shelves can be transported by AGVs. An AGV goes to the location of the inventory shelf to lift it and transports it to a picking station (207) where a picking robot works (204). The picking robot picks the ordered items from the transported inventory shelf and sorts them into sorted shipping boxes (209) on the sorting shelf. The inventory shelf (202), from which the items were picked at the picking station, is returned to the inventory area (205), or transported to another picking station that requires items on it for other shipping destinations. A shipping box with all the ordered items sorted is transported to the next working area by conveyors (206) or other equipment.

In the process flow of FIG. 1, the Warehouse Management System (WMS) receives shipping orders from facilities related to the item transactions such as retail stores and host systems (S101). Such a plurality of orders can be received in real time, or can be accumulated (e.g., as a backlog from overnight orders) in accordance with the desired implementation. Further, sequential orders that are received can be processed sequentially in accordance with the desired implementation. In example implementations described herein, a plurality of task batches are created in response to fulfill to the plurality of orders, whereupon the robots of the environment cooperatively process the plurality of task batches. These shipping orders are aggregated to a task batch for every period of time or per every number of orders (S102). WMS assigns the task batches to AOPS (S103). The calculator equipped in the AOPS controller calculates the optimal control strategy for the assigned task batches based on the information about the expected operation environment (S104). The optimal strategy can be obtained by tuning its parameter set used for computing the control of its targets through the simulation of AOPS with a predefined operations process. The parameter set is tuned to achieve the operation status requested by the system operator such as maximizing the system throughput or minimizing item queues in the system. To simulate the operations in AOPS, the calculator has information about the operation such as system layout, specifications and functions of material handling robots utilized in AOPS, and operation rules.

The calculator might be included in WMS or be located outside from both WMS and AOPS if it can communicate with both the WMS and the AOPS controller and obtain the information required for the calculation. The calculator sends parameter sets used in the derived optimal strategy to the portion of memory (S105) that stores the received parameter sets in the AOPS controller (S106). If the AOPS controls the plurality of types of material handling robots (e.g. a picking robot, an AGV, etc.) or involves a plurality of processes (e.g., carrying function, picking function, etc.), the calculator may generate the plurality of parameter sets for each type of robots or functions in S104 for optimizing the corresponding control strategies. Due to the differences of control targets, the generated plurality of types of parameter sets can be registered in several portions of memory.

AOPS controller processes the assigned task batch with the optimal strategy by referring to the parameter sets stored in the portion of memory (S107) based on the status of control target. The referred parameter sets are loaded and used to control one or more of the plurality of robots based on the loaded parameter set to execute the plurality of task batches. If further shipping orders are added to WMS, then the above processes are conducted repeatedly.

Accordingly, through the system of FIGS. 1 and 2, orders can be processed by simulation to generate parameter sets which are stored in memory (e.g., in table form or as management information) and then loaded to the appropriate controllers as assigned to the plurality of task batches. The parameter set can be state transition tables that indicate specific states or processes to execute based on sensor values/other values, can be weights and biases for neural networks, and otherwise in accordance with the desired implementation.

Figure 3:
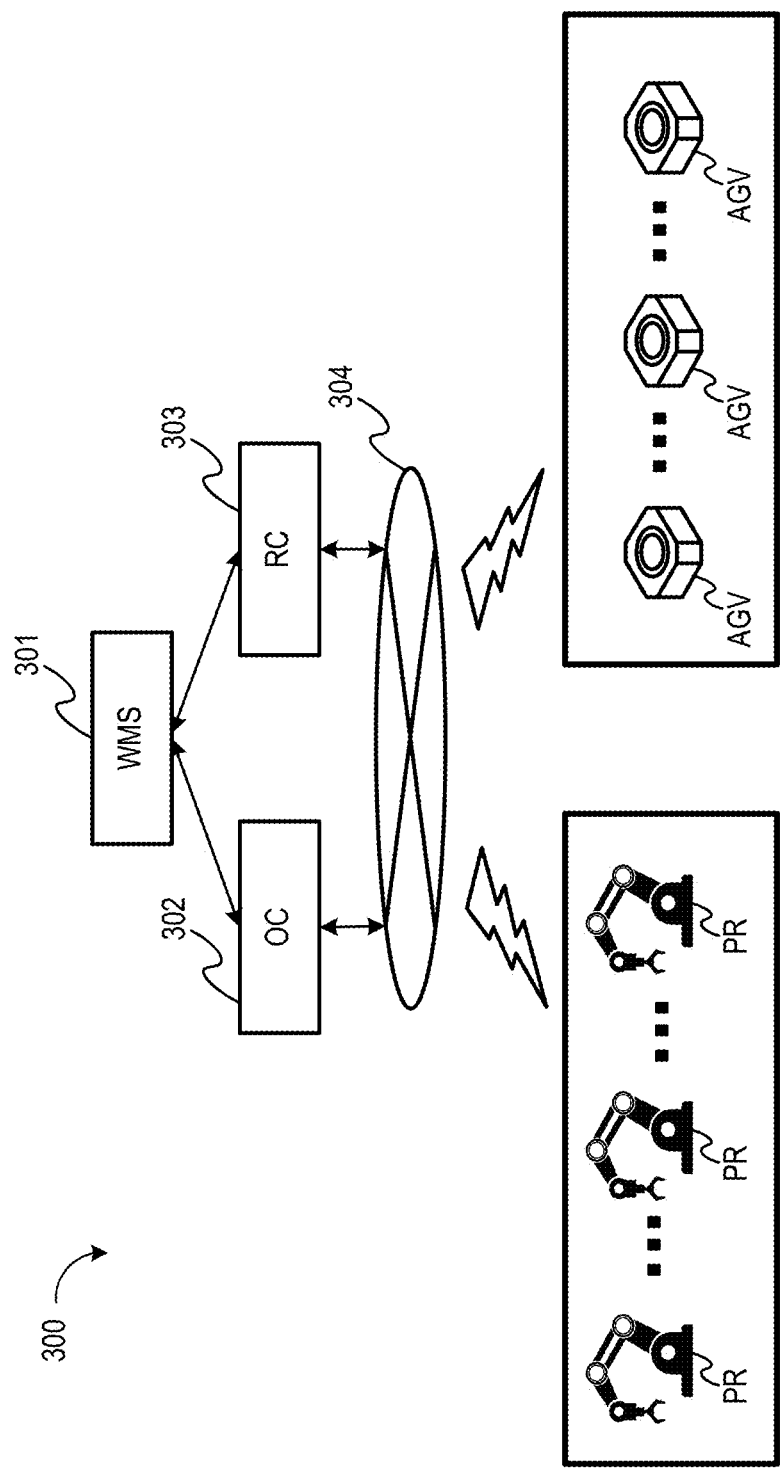
FIG. 3 illustrates an example of system configuration of AOPS based on the equipment configuration indicated in FIG. 2, in accordance with an example implementation.

FIG. 3 illustrates an example of system configuration (300) of AOPS based on the equipment configuration indicated in FIG. 2, in accordance with an example implementation. The AOPS controller introduced in FIG. 1 involves two controllers processing automated operations. The first one is an Order Controller (OC, 302) that receives the parameter set used for its control strategy from WMS (301) as described in S105. OC also receives the shipping orders and calculates information for the picking operation such as order batching and a processing sequence of the received order based on the control strategy. The second one is a Robot Controller (RC, 303) that receives the parameter set used for its control strategy from WMS (301) as described in S105. RC also receives operating conditions of robots and calculates information required for the robots' behaviors such as selections of items or locations.

Here, the parameter sets are different between OC and RC because these controllers have different functionalities. Accordingly, the parameter set can be bifurcated into one set for the OC and another set for the RC, which can also be separately generated in accordance with the desired implementation due to their separate roles. The OC and the RC are computing machineries such as compute servers. The OC will utilize its parameter set to manage allocation of received orders, whereas the RC will utilize its parameter set to manage one or more of the robots. In the example implementations, AGVs, and PRs are controlled by the RC. OC, RC, AGVs, and PRs are connected by wireless network (304). Through the network, every component sends and receives information required for processing its tasks from others. Based on the received robot status and its robot type, the controller appropriate for processing the robot's next task identifies the control strategy and sets the corresponding parameter set to compute the next control.

The relationship between the robot status and corresponding task can be predefined by introducing a hash table such as the state-transition table. To simulate the AOPS operations, the calculator may also refer to or manage the same table. The control strategy of RC is different for each robot type. As an alternative way to achieve a similar configuration of FIG. 3, OC and RC can be unified to a single computing machinery and implemented as other functions on it. Further, more than two OCs and RCs may be introduced in AOPS in which AGVs and PRs are controlled by different RCs organizing robots based on their types.

In example implementations, AGV moves along the path to its destination indicated by RC. AGV has a reading device such as a visible light camera or infrared camera, at the bottom of the vehicle body, and scans the floor surface while moving. For example, if the position markers indicating the two-dimensional coordinate on the floor are barcodes, the reading device is a barcode reader. When the AGV passes through the marker, the reading device scans the barcode indicating, and the AGV acquires the coordinate value. The AGV sends the acquired coordinate values to RC.

Figure 4:
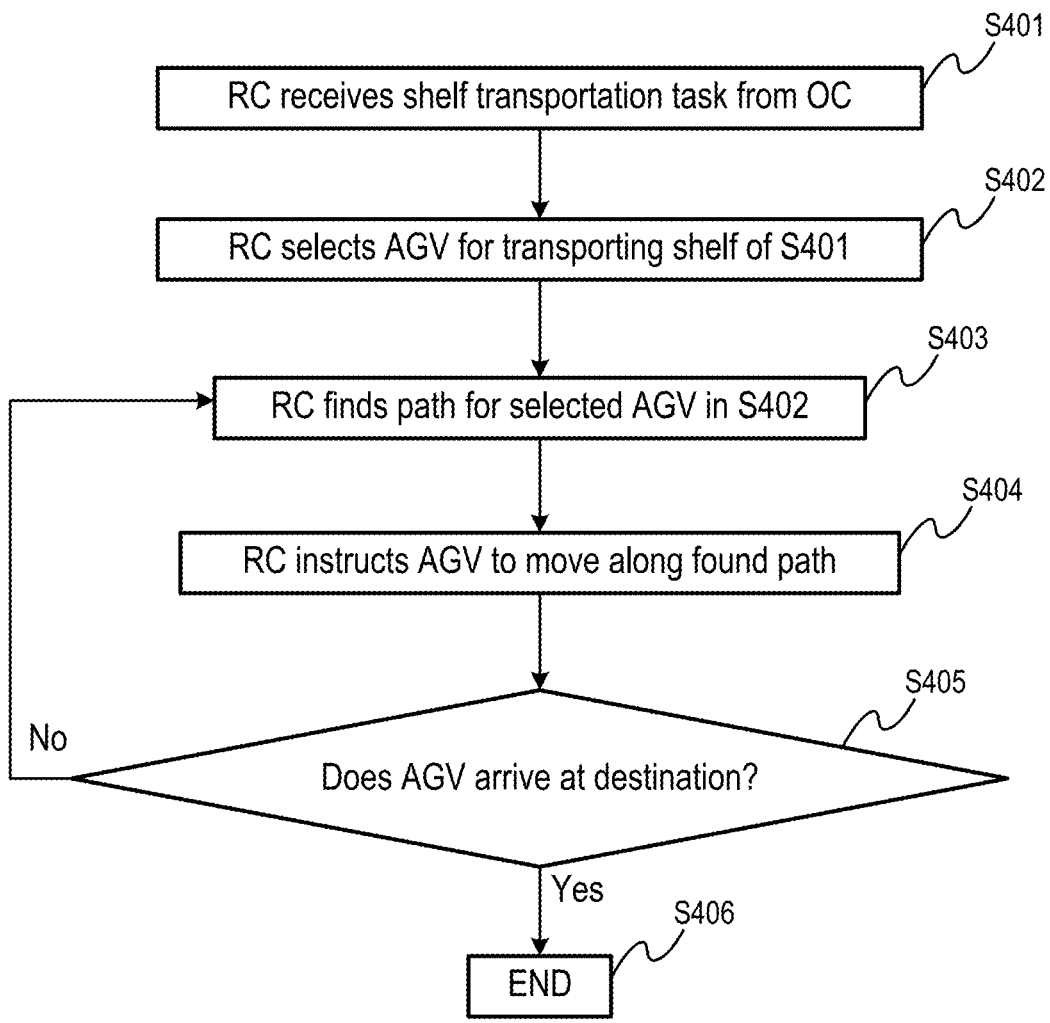
FIG. 4 illustrates an example of a control flow of the AGV to carry out the inventory shelf from the inventory area, including pathfinding and movement instruction processes in RC in accordance with an example implementation.
Figure 5:
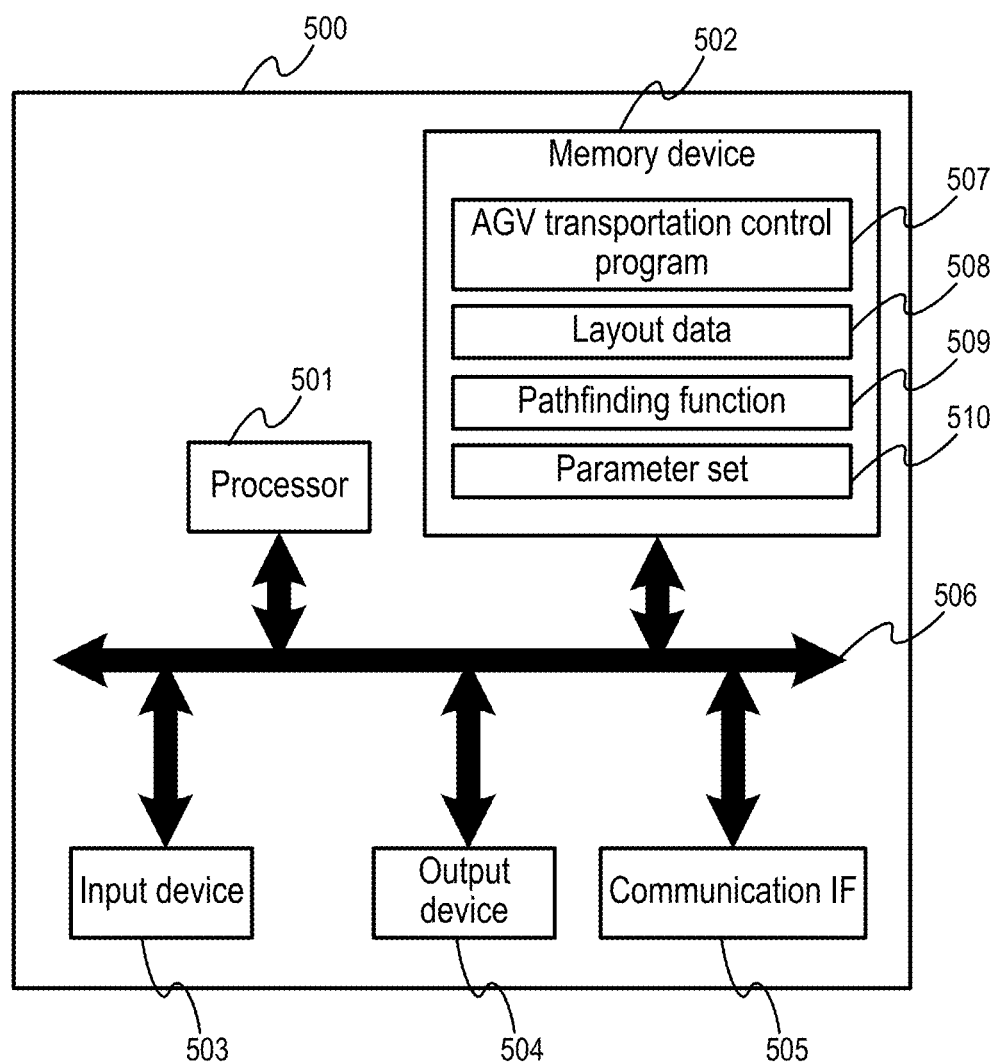
FIG. 5 illustrates an example of the hardware configuration of RC used for controlling AGV in accordance with an example implementation.

FIG. 4 illustrates an example of a control flow of the AGV to carry out the inventory shelf from the inventory area, including pathfinding and movement instruction processes in RC in accordance with an example implementation. FIG. 5 illustrates an example of the hardware configuration of RC (500) used for controlling AGV in accordance with an example implementation. Depending on the desired implementation, the hardware configuration can also be applied to the OC, or both the RC and OC can be implemented on the same hardware. The hardware configuration of the RC (500) can involve but is not limited to a processor (501) which can be in the form of a hardware processor such as a central processing unit (CPU) or any combination of hardware and software processors, a memory device (502) such as cache memory, Random Access Memory, or other storage memory in accordance with the desired implementation, an input device (503) such as a keyboard, mouse, touch screen, and so on, an output device (504) such as a display, a communication interface (I/F) (505) to communicate with the robots, and a bus (506) to communicatively interlink the elements. Memory device (502) can include the AGV transportation control program (507), the layout data (508), the pathfinding function (509) and the parameter set(s) (510).

RC (500) generates a (sub-)optimal AGV path to the destination based on the control strategy (S403) and sends it to the AGV (S404). As an example, the control strategy of AGV pathfinding corresponding to a pathfinding function (509) can be achieved by implementing the shortest path algorithms such as Dijkstra's algorithm, A*, or other algorithms in accordance with the desired implementation. In this case, the parameter set (510) derived by the calculator in S104 represents the path costs used in the pathfinding algorithm such as translation and rotation movements of the AGVs and the congestion of the AGVs.

As an alternative way to generate the AGV paths by the control strategy, the RC has a couple of predefined path-cost sets used for its pathfinding algorithm, and the control strategy is represented by a table or function that can select the appropriate path-cost set based on the congestion status of the AGV working area and layout data (508). The table-type control strategy shows a value indicative of how much a given pair of the congestion status and the path-cost set is appropriate for the operation. In this case, the parameter set is used in the estimator configured to estimate the tabular values. When the estimator is expressed as a fully connected neural network, the parameter set corresponds to its weights and biases.

On the other hand, the function-type control strategy can also directly select the appropriate path-cost set for the given congestion status. When the function is expressed as a fully connected neural network, the parameter set corresponds to its weights and biases. The control strategy can also output path costs of the calculated path for a given destination. These path costs are used for selecting an appropriate AGV (S402) when more than two AGVs can be assigned the shelf-transportation task sent from OC (S401). When the AGV's path is generated partially, or the AGV is caught in the congestion caused by other AGVs ("NO" in S405), the RC recursively generates the path until the AGV arrives at its destination ("NO" in S405). When AGV completes the assigned tasks (e.g., arrives at its destination) ("YES" in S405) and the related tasks such as lifting the shelf up or down and picking items from the transported shelf are completed, the robot transmits the signal to the controller and RC assigns a new transportation task to the AGV. Depending on the desired implementation, the controller can alternatively or in conjunction observe the status of each robot and determine the new assignment timing. The controller checks the status of robot from the response to the status request or the transmitted notice from the robot. If the robot is free or has no subsequent task, the controller can assign a new task batch to the robot and store the relationship between the robot and its assigned task batch.

In example implementations described herein, generating the parameter set for the execution by the plurality of robots to execute the plurality of task batches can involve generating one or more parameter sets for each type of sub-task in the plurality of task batches. For example, other AGVs' sub-tasks such as shelf transportation from the inventory area to the picking station and shelf return from the picking station to the inventory can be achieved by the similar process as shown in FIG. 4. Such different types of transportation sub-tasks can be controlled with unique pathfinding functions. Therefore, the RC may have a plurality of pathfinding functions with different parameter sets tuned for each type of transportation sub-task. In such an example, the AGV can do a sequence of such transportation tasks (e,g the sequence of the task batches can involve sequential sub-tasks of carry the shelf to picking station, return the shelf to the inventory area, etc.), whereupon the appropriate parameter set is loaded according to current situation of the target robot.

The picking robot (PR) picks one or more items from the transported inventory shelf from the AGV and places them to a shipping box. The planned items and shipping box are selected by the RC based on the situations at picking station. As well as the control strategy for AGV pathfinding, the control strategy for selecting the item and the sorting box is represented by the table or function. The RC has a couple of predefined functions that can select items. The table-type control strategy shows a value indicative of how much a given pair of the status of the picking station and the predefined function is appropriate for the operation. In this case, the parameter set is used in the estimator configured to estimate the tabular values. When the estimator is expressed as a fully connected neural network, the parameter set corresponds to its weights and biases. On the other hand, the function-type control strategy can also directly select the appropriate predefined function for the given congestion status.

When the function is expressed as a fully connected neural network, the parameter set corresponds to the weights and biases of the neural network. The parameter set can be loaded to calculate the optimized process by executing the fully connected neural network with its weights and biases, whereupon the robots can execute according to the calculated optimized process as determined by the fully connected neural network. Such a parameter set can be determined from executing a simulation of the plurality of robots to determine the optimized processes. The selections of the picking item and sorting box are recursively executed for one transported inventory shelf until all items are picked from it. Because the function of the PR is different from that of the AGV, these robots may be controlled with different RCs depending on the desired implementation. Accordingly, different control strategies can be prepared according to the robot type or its function type. The generation of the parameter set is conducted in terms of robot type and/or its function (e.g., picking, carrying, etc.) and the appropriate parameter set can be loaded based on the robot type or function.

OC allocates shipping boxes to the picking stations based on its control strategy. The ordered items required for the allocated shipping box determines which inventory shelves should be transported to the picking station by AGVs. In the example implementations as illustrated, for example, in FIG. 2, the RC manages the robot operations, including the picking robots and the AGVs. The OC control the assignment of tasks. For example, at the picking station illustrated in FIG. 2, the OC can control which shipping box will be processed in which station. The shipping boxes are selected based on the progress status of picking operation. The system efficiency depends on both AGV's shelf-transportation time and PR's pick-and-place time because the efficient picking operations can be achieved by minimizing the waiting time when the PR waits for the arrival of inventory shelf to the picking station. Therefore, both the congestion status in the AGV working area and the picking operation status at the picking stations are used as an input of the OC's control strategy. As well as the RC's control strategy, the OC's one can be represented by the table or function. Furthermore, the hardware of the OC can be achieved by installing the similar configuration of RC. As an example of the shipping-box selection algorithm, the seed algorithm can be applied as the predefined function in OC. In this case, a couple of hyperparameter sets used in the algorithm such as the scoring factors and seed selection methods are also stored in the memory device of the OC. The OC's control strategy can select the appropriate hyperparameter set for given inputs. As another function of the OC, if the same kinds of items are stored in different inventory shelves, OC may select an appropriate inventory shelf for its order by taking the stock layout and other orders into account. In this case, the OC's control strategy also selects hyperparameter sets of combinatorial optimization methods. If the OC controls parameter sets corresponding to the different types of tasks (such as shipping-box allocation and inventory-shelf selection), the OC may involve a plurality of controllers based on the types of tasks.

The calculator has a control strategy similar to the OC and RC, and can simulate the operations of AOPS. In the example implementations, the simulation includes both the AGVs' shelf transportations and PRs' pick-and-place operations. As an example of the method for obtaining the optimal parameter set of the control strategy, a reinforcement learning framework can be introduced to the calculator. In such an example implementation, the parameter set can include parameters associated with a function representing a policy or state-action value acquired from the reinforcement learning framework, which can be used to define the optimal control strategy or process. The optimal control strategy can be obtained through the training phase during which the calculator repeatedly simulates the picking operations and updates the parameter set based on the simulation results.

Processor(s) 501 can be configured to execute a method or computer instructions for a system involving a plurality of robots, which can involve for receipt of a plurality of real time orders, generating a plurality of task batch es to fulfill the real time order; generating a parameter set for execution by the plurality of robots to execute the plurality of task batches; and for a determination by a controller that one or more of the plurality of robots is to execute the plurality of task batches: loading the parameter set; and controlling the one or more of the plurality of robots based on the loaded parameter set to execute the plurality of task batches as illustrated in FIGS. 1 and 2.

Processor(s) 501 can be configured to execute a method or computer instructions to determine the one or more of the plurality of robots to execute the plurality of task batches by identifying ones of the plurality of robots that are to execute a control strategy associated with the plurality of task batches based on the relationship stored in RCs between the robots and their task batches; wherein the controlling the one or more of the plurality of robots based on the relationship to execute the plurality of task batches involves transmitting the instructions obtained from the calculation by the control strategy to the one or more of the plurality of robots for execution as illustrated in FIG. 4.

As described herein, the parameter set can involve a first parameter set for an order controller and a second parameter set for a robot controller. Processor(s) 501 can be configured to execute a method or computer instructions involving managing allocation of received orders the at least one picking robot by using the first parameter set as the order controller, and managing the one or more of the plurality of robots by using the second parameter set as a robot controller.

Depending on the desired implementation, the loaded parameter set can involve parameters associated with a neural network, wherein processor(s) 501 can be configured to execute a method or computer instructions involving calculating an optimized process for the plurality of robots according to the neural network with the loaded parameter set, wherein the robots are instructed to execute according to the calculated optimized process. Such a parameter set can be generated from executing a simulation of the plurality of robots.

Depending on the desired implementation the loaded parameter set includes parameters associated with a function representing a policy or state-action value acquired from reinforcement learning.

Processor(s) 501 can be configured to execute a method or computer instructions to control one or more of the plurality of robots based on the loaded parameter set to execute the plurality of task batches by executing a control strategy for each of the one or more of the plurality of robots based on one or more of a robot type or a robot function, wherein the generating the parameter set for the execution by the plurality of robots to execute the plurality of task batches is done for one or more of the robot type or the robot function; wherein the loading the parameter set is conducted based on the robot type or the robot function as described herein. Further as described herein, the generating the parameter set for the execution by the plurality of robots to execute the plurality of task batches can involve generating one or more parameter sets for each type of sub-task in the plurality of task batches.

In the present embodiment, several task batches may be processed in parallel in the AOPS. For example, when a preceding task batch approaches completion of its picking tasks, its operation only needs the small fraction of the system resources for processing the task batch. Therefore, the subsequent task can be installed from WMS to AOPS. The picking area encircled with a dashed and dotted line as illustrated in FIG. 2 shows the example of the picking operation for the preceding task batch. In this case, OC and RC can start picking operations of the subsequent task batch by utilizing the picking stations, AGVs, and inventory shelves located outside the encircled area with the dashed and dotted lines. However, the optimal control strategies tend to be different between these task batches because the picking tasks, AGVs, picking stations, and inventory shelves are different. To achieve the optimal control strategies for both task batches, the RC stores the two parameter sets derived by the calculator. Each parameter set corresponds to a different task batch, and these associations are also stored in the RC.

FIG. 6 illustrates an example of a data table of parameter sets used for the control strategy of RC in accordance with an example implementation. The data table is stored in the memory device (502) as illustrated in FIG. 5. Each column in FIG. 6 records a tuple involving the task batch ID, Parameter set ID, and a value of each parameter. In FIG. 6, there are N parameters for the control strategy and each parameter is stored as a float variable. All parameter sets have N parameters because the control strategy is expressed as a fixed functional type such as the same shapes of the polynomial function and the neural network. The RC switches the parameter set and its control strategy executes the calculation by using the switched parameter set according to the task batch in which the processing picking task is contained.

Figure 7:
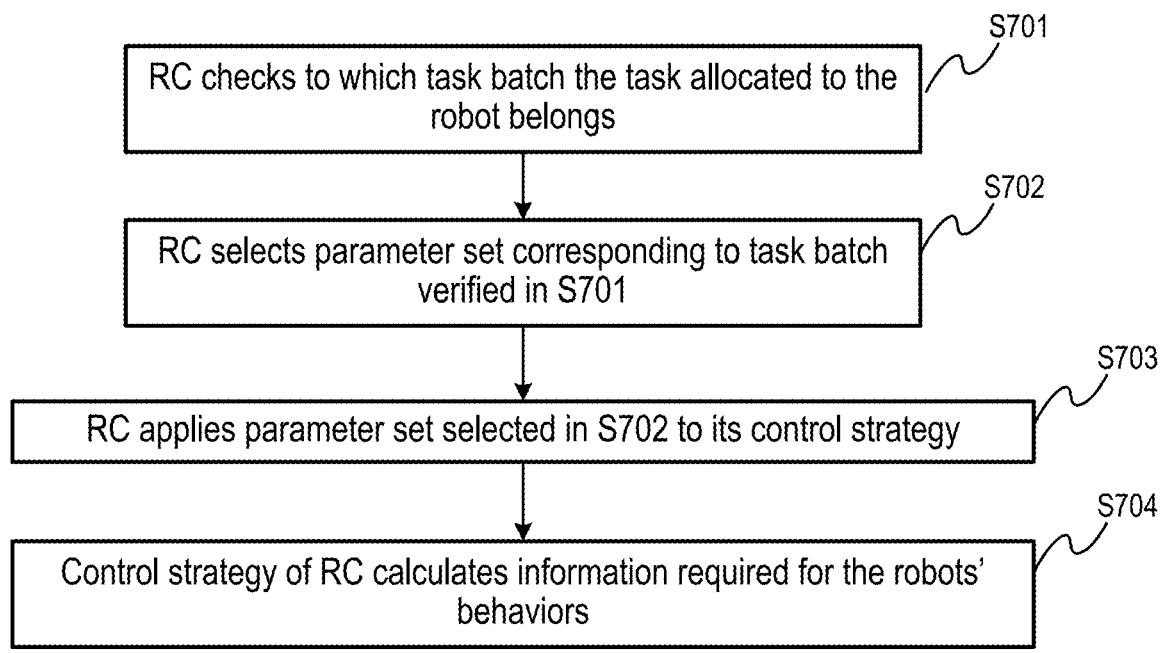
FIG. 7 illustrates a process flow to select a parameter set for the RC corresponding to a task batch, in accordance with an example implementation.

FIG. 7 illustrates a process flow to select a parameter set for the RC corresponding to a task batch, in accordance with an example implementation. All of the robot tasks such as shelf transportation and item picking are linked with their task batch. To make an optimal decision for control the robot, the RC first checks to which task batch corresponds to the robot's task (S701). Then RC selects the parameter set corresponding to the verified task batch in S701 (S702) and applies the selected parameter set to its control strategy (S703). Here the parameter set is selected by referring to the data table shown in FIG. 6. The control strategy of RC calculates information required for the robots' behaviors (S704). As an example of the application of this process flow to the robot's control follow, a series of the flow is applied when RC receives the shelf transportation task (S401) in FIG. 4.

Through the example implementations described herein, the automated system can maintain high productive operations during parallelized operation of different task sets. The functions of item storage and transportation in automated order picking systems can also be achieved by installing other material handling equipment such as a combination of automated storage and retrieval system and plural conveyors.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a system comprising a plurality of robots, the method comprising:
for receipt of a plurality of orders by a Warehouse Management System (WMS):
generating a plurality of task batches to fulfill the plurality of orders;
generating a parameter set for execution by the plurality of robots to execute each of the plurality of task batches; and
for a determination by a controller that one or more of the plurality of robots is to execute one of the plurality of task batches:
loading the parameter set generated for the task batch; and
controlling the one or more of the plurality of robots based on the loaded parameter set to execute the plurality of task batches,
wherein the parameter set comprises state transition information indicating specific states or processes,
wherein the parameter set comprises a first parameter set and a second parameter set,
wherein the controller comprises an order controller configured to perform order batching and sequence processing of order received from the WMS by using the first parameter set, and a robot controller configured to manage the one or more of the plurality of robots by using the second parameter set.

2. The method of claim 1, wherein the controller is configured to manage a relationship between each of the plurality of task batches and a corresponding one of the plurality of robots assigned to execute said each of the plurality of task batches;
wherein the determining the one or more of the plurality of robots to execute the plurality of task batches is done based on the managed relationship.

3. The method of claim 1, wherein the plurality of robots comprises at least one picking robot and at least one automated guided vehicle.

4. The method of claim 1, wherein the loaded parameter set comprises parameters associated with a neural network, wherein the controller is configured to calculate an optimized process for the plurality of robots according to the neural network with the loaded parameter set, wherein the robots are instructed to execute according to the calculated optimized process.

5. The method of claim 4, wherein the parameter set is generated from executing a simulation of the plurality of robots.

6. The method of claim 1, wherein the loaded parameter set includes parameters associated with a function representing a policy or state-action value acquired from reinforcement learning.

7. The method of claim 1, wherein the controlling the one or more of the plurality of robots based on the loaded parameter set to execute the plurality of task batches comprises executing a control strategy for each of the one or more of the plurality of robots based on one or more of a robot type or a robot function;
wherein the generating the parameter set for the execution by the plurality of robots to execute the plurality of task batches is done for one or more of the robot type or the robot function;
wherein loading the parameter set is conducted based on the robot type or the robot function.

8. The method of claim 7, wherein the generating the parameter set for the execution by the plurality of robots to execute the plurality of task batches comprises generating one or more parameter sets for each type of sub-task in the plurality of task batches.

9. A system comprising:
a plurality of robots; and
one or more controllers, the one or more controllers comprising:
a processor, configured to execute instructions comprising, for receipt of a plurality of orders by a Warehouse Management System (WMS):
generating a plurality of task batches to fulfill the plurality of orders;
generating a parameter set for execution by the plurality of robots to execute each of the plurality of task batches; and
for a determination by a controller from the one or more controllers that one or more of the plurality of robots is to execute one of the plurality of task batches:
loading the parameter set generated for the task batch; and
controlling the one or more of the plurality of robots based on the loaded parameter set to execute the plurality of task batches,
wherein the parameter set comprises state transition information indicating specific states or processes,
wherein the parameter set comprises a first parameter set and a second parameter set,
wherein the controller comprises an order controller configured to perform order batching and sequence processing of order received from the WMS by using the first parameter set, and a robot controller configured to manage the one or more of the plurality of robots by using the second parameter set.

10. The system of claim 9, wherein the one or more controllers is configured to manage a relationship between each of the plurality of task batches and a corresponding one of the plurality of robots assigned to execute said each of the plurality of task batches;
wherein the determining the one or more of the plurality of robots to execute the plurality of task batches is done based on the managed relationship.

11. The system of claim 9, wherein the plurality of robots comprises at least one picking robot and at least one automated guided vehicle.

12. The system of claim 9, wherein the loaded parameter set comprises parameters associated with a neural network, wherein the one or more controllers is configured to calculate an optimized process for the plurality of robots according to the neural network with the loaded parameter set, wherein the robots are instructed to execute according to the calculated optimized process.

13. The system of claim 12, wherein the parameter set is generated from executing a simulation of the plurality of robots.

* * * * *